United States Patent [19]

Van Dyke et al.

[11] Patent Number: 5,708,812
[45] Date of Patent: Jan. 13, 1998

[54] METHOD AND APPARATUS FOR MIGRATING FROM A SOURCE DOMAIN NETWORK CONTROLLER TO A TARGET DOMAIN NETWORK CONTROLLER

[75] Inventors: Clifford P. Van Dyke; Michael M. Swift, both of Bellevue; Keith W. Logan, Kirkland; Pradyumna K. Misra, Issaquah, all of Wash.

[73] Assignee: Microsoft Corporation, Redmond, Wash.

[21] Appl. No.: 588,344

[22] Filed: Jan. 18, 1996

[51] Int. Cl.$^6$ ............................................. G06F 17/60
[52] U.S. Cl. .................... 395/712; 395/201; 395/609; 395/619; 395/186; 395/500
[58] Field of Search .......................... 395/712, 201, 395/609, 619, 186, 500

[56] References Cited

U.S. PATENT DOCUMENTS

| | | | |
|---|---|---|---|
| 4,694,397 | 9/1987 | Grant et al. | 395/242 |
| 5,222,018 | 6/1993 | Sharpe et al. | 395/230 |
| 5,367,698 | 11/1994 | Webber et al. | 395/800 |
| 5,410,703 | 4/1995 | Nilsson et al. | 395/712 |
| 5,586,304 | 12/1996 | Stupek, Jr. et al. | 395/712 |
| 5,608,874 | 3/1997 | Ogawa et al. | 395/200.15 |

OTHER PUBLICATIONS

Rita Wong, *Windows NT PortUAS Utility Design Note*, Microsoft Corporation, Oct. 31, 1991.

*Primary Examiner*—Kenneth S. Kim
*Attorney, Agent, or Firm*—Leydig, Voit & Mayer, Ltd.

[57] ABSTRACT

A method and apparatus are described for facilitating the migration of accounts from a source domain to a target domain in a computer network without affecting the capability of users and services associated with the source domain to access source domain resources after the users' and services' accounts have been migrated to the target domain. Migrating source domain accounts is facilitated by a dual-identity Domain Controller having simultaneous access to replicating mechanisms of both the source domain and the target domain. When accounts are migrated to a directory service of objects for the target domain, the accounts are modified to include security information defining access rights of the migrated accounts within the target domain. Security information relating to an account's access rights in the source domain is preserved in the migrated account stored in the target domain directory service of objects databases.

13 Claims, 5 Drawing Sheets

| Account Name | 50 |
|---|---|
| Migrated Account Name | 51 |
| Current Domain ID | 52 |
| Migrated Domain ID | 53 |
| Current Relative ID | 54 |
| Migrated Relative ID | 55 |
| Group List (and previous SID list) | 56 |
| Accounts Within Group (for group account) | 58 |

Account Security Context Data

| Current Group #1 Account ID | 62 |
|---|---|
| Current Group #2 Account ID | 64 |
| Current Group #3 Account ID | 66 |
| Prior Account ID | 68 |
| Prior Group #1 Account ID | 70 |

Group & Previous SID List

FIG. 3

| | |
|---|---|
| 72 | Domain Name |
| 74 | Domain ID |
| 76 | Mode |
| 78 | Old Outbound Trust Password |
| 80 | New Outbound Trust Password |
| 82 | Inbound Trust Password |
| 84 | Outbound Trusted Domains |
| 86 | Inbound Trusted Domains |
| 88 | MigrationBdcName |
| 90 | Migrated Accounts |
| 92 | Synchronization State |
| 94 | Policy Data |

Migrated Domain Downlevel Domain Object

FIG. 4

MIGRATION

EMULATION

METHOD AND APPARATUS FOR MIGRATING FROM A SOURCE DOMAIN NETWORK CONTROLLER TO A TARGET DOMAIN NETWORK CONTROLLER

AREA OF THE INVENTION

The present invention generally relates to computer object administration facilities, and more particularly to methods for maintaining previously established relationships with network resources when computer system administration objects are reconfigured in a computer network which in turn necessitates a change in the basic network accounts administration infrastructure.

BACKGROUND OF THE INVENTION

Replacing or upgrading a currently functioning network operating system by a new network operating system presents a number of concerns which go far beyond the purchase price of the new network operating system. Adapting an existing network and its associated resources to a new network operating system likely includes substantially modifying a number of existing network components such as, for example, network administrative resources, internal maintenance structures and interfaces for the network operating system. In addition, the new network operating system likely differs from the existing network in regard to the manner in which network operations such as file maintenance and enforcing security are carried out. Increases in the degree of change between an existing network operating system and a new operating system are accompanied by corresponding increases in both the complexity of the task of converting to the new network operating system and the uncertainty of success in adapting the network to the new operating system.

One potential concern, arising from installing a new network operating system, is maintaining user access to the network during the process of transferring control of a network from the existing administrative facilities running on one or more network servers to the new administrative facilities provided by the new network operating system. Shutting down a network or denying access by users to network resources in order to transfer control to new administrative facilities may not be possible in mission critical environments where the system must remain functional around-the-clock. The transfer process may last a period of time exceeding a period in which users and network entities can reasonably be denied access to the network resources.

A second potential concern, arising from installing a new network operating system or merely upgrading an existing one, is maintaining the ability to identify resources and users, and to enforce security measures, under the new or upgraded network operating system. In known network operating systems, each user account and network resource is uniquely identified in the network. Furthermore, the users may have security information—such as passwords and/or group affiliations—defining access rights for the users to protected network resources. This security information is also maintained in a network security database associated with the current network operating system. When a new network operating system is installed, the previously established security state of the network represented by the network security database and security information stored in network resources may no longer be useful due to changes to the identifications associated with users and/or network resources resulting from installing a new network operating system or merely upgrading an existing one.

The above described second network operating system conversion concern arises particularly in network operating systems incorporating access control list (ACL) based network security. ACLs are a well known security mechanism incorporated within network operating systems in order to limit access by users to protected network resources. The ACLs, which are associated with specific protected network resources, comprise a set of access control entries (ACEs). Each ACE in an ACL identifies a network entity (e.g., an individual user or group) and corresponding access rights granted or denied the network entity with respect to the protected network resource with which the ACL is associated.

In a known network operating system incorporating ACL based security, a security accounts manager creates a "security context" (also referred to herein merely as a "context") for each account. The security context formulated by the security accounts manager comprises an account identification as well as a list of group accounts with which the identified account is associated. The account security contexts are stored in a security accounts manager database. Whenever a user or service accesses a network resource, then a context is created and provided to a server for determining whether to grant the user access to the requested network resource. The user account identification and the list of group identifications in the context are compared by the server for the requested network resource to the ACEs for the requested network resource in order to determine whether to grant the requested access.

As networks become larger and the number of accounts, connected machines, and resources increases, the complexity of the task of administering the security databases for the accounts and resources provided by the connected machines on the local area networks increases. The task of administering the accounts and the protected network resources accessed by users is decentralized by partitioning the accounts and resources within the network (e.g., resources and accounts) into collections—referred to as "domains."

As will be known to those skilled in the art, the term "domain" has a particular meaning in the context of MICROSOFT network operating systems. However, when used to describe the invention without reference to a specific network operating system, the term domain is intended to encompass similar network entities for establishing collections of accounts, and uniquely identifying individual accounts within the established collections (e.g., "realms" or NETWARE "directory trees").

Thus, a domain, in the context of the present invention comprises a cooperatively administered collection of accounts and resources within a network. It is noted that the term "cooperatively" refers to the enforcement of account identification policies within a domain such that all accounts are uniquely identified within a same collection (i.e., domain). As will be appreciated by those skilled in the art, a domain may include more than a single domain controller, and in fact, a controller may only administer a portion of the entire collection of accounts associated with a domain (e.g., NETWARE "directory tree" controllers).

Domains are especially invaluable in large corporate-wide networks since they facilitate the partitioning of network resources and users of the resources into smaller, more easily managed, sub-groups of machines within the network that are typically accessed by a particular sub-group of users. In addition, domains allow grouping of servers (controllers) so that an individual or group account need only be defined once for the entire set of servers in the domain. For example, a network for a large organization having the above described domain identification capability is typically partitioned into a number of domains arranged along corporate groups. A domain controller for each domain maintains a list containing user (individual) and group account identifications. In order to facilitate identification of accounts with particular domains, each account identification for a user account or group account includes (1) a domain identification which distinctly identifies the domain with which the account is associated from other network domains, and (2) a "relative identification" which distinctly identifies the account from other accounts having a same domain identification.

When an existing operating system is upgraded or replaced by a new network operating system, existing accounts may be assigned new security identifications. In order to enable the users affected by the changed account identifications to access protected network resources under the new assigned account security identifications, the ACLs on protected network resources are modified to include the new identifications.

Changing the security identifications, the means for identifying the source of a request, presents a significant problem in view of the presence of the typically large number (possibly thousands) of ACLs corresponding to the network resources associated with the former operating system.

In view of the potentially large number of ACLs in a network, it is possible, and indeed likely, that some of the ACLs will not be updated to include the new security identifications. The process of updating ACLs is further complicated by the fact that a number of the machines containing the protected network resources having ACEs specifying old account identifications may be off-line, or the protected network resource (such as archived data) is unavailable when an attempt is made by a tool to update the ACEs.

A third concern arising from upgrading or replacing an existing network operating system by a new one, is the untested status of the new network operating system with respect to the particular computer network upon which the network operating system is to be installed. Regardless of the extent of pre-market testing of a network operating system, a customer will likely hesitate turning over control of a network, having potentially thousands of shared network resources and hundreds or even thousands of user accounts, to a new network operating system. If the new network operating system crashes or fails to perform in a manner expected by customer, the customer will likely be faced with the task of re-installing the old network operating system until the vendor provides a solution to the problems experienced by the network while running under the new network operating system.

A known network operating system (WINDOWS NT) replaced an existing network operating system (LANMAN) by means of a utility (PORTUAS) which reads account information from an accounts database for a domain existing under the existing operating system, converting the account information to a new format for use by the new network operating system domain administrator, and then saving each converted account in a new account database for use by the new network operating system. In such a conversion process, the network operating systems (old and new) maintained their complete capabilities during a transition of all accounts and network resources to the new network operating system and during a testing period thereafter wherein the customer was able to gain confidence in the new system.

In access control list (ACL) based systems, this transition process included the conversion of all of the ACLs for all protected network resources.

This transition approach for the known network operating system presents problems since the new and old operating systems are each performing the same operations for each network request during the transition period. When a user logs on, the user must log onto each of the systems. Account databases for both network operating systems were manually synchronized until the old network operating system was removed.

Alternatively, the primary domain controller for the existing network operating system was deactivated and the administrative duties over the accounts within the existing domain were placed totally under the control of the new network operating system (WINDOWS NT) primary domain controller during the transition to a new network operating system. The primary domain controller for the WINDOWS NT network operating system controlled the translation of account information to the new operating system. Since the primary domain controller for the existing network operating system was retired, the new network operating system primary domain controller assumed those duties as well during the transition. Thus, in the case of a transition to the WINDOWS™ NT network operating system, the new network operating system administrator completely assumes the duties of administering the network operating system. This previously used approach to converting to a new network operating system requires a very high degree of confidence and trust by a customer in the new network operating system.

SUMMARY OF THE INVENTION

It is a general object of the present invention to remedy the above shortcomings of known methods for transferring control of a network to a new network operating system.

It is an object of the present invention to minimize the impact upon users of replacing an old network operating system with a new network operating system.

It is yet another object of the present invention to alleviate some of the concerns frequently expressed by network administrative staff regarding the adoption of a new network operating system.

The above and other objects are met in a migration method for a network operating system wherein a domain controller performs steps to gradually transfer control over accounts and protected network resources to a new network operating system. These steps are facilitated by a domain controller capable of emulating another network operating system while operating under a first network operating system.

During the transfer of accounts from a first domain to a second domain, the domain from which accounts are copied is referred to herein as the "source domain". The domain receiving the transferred accounts is referred to as the "target domain". While in the illustrated embodiment of the invention the source domain operates under a different network operating system from the target domain network operating system. The present invention could be incorporated into a setting where the source and target domain operating systems are the same.

In accordance with the present invention, a migration domain controller for carrying out the present invention establishes a second identity as a source domain controller. Thereafter, the migration domain controller utilizes the second identity to migrate source domain account information to an account database for the target domain during a migration stage. During the migration stage, the migration domain controller maintains its primary identity as a target domain controller and responds to target domain requests from target domain users and services.

Furthermore, during the migration stage at least one source domain controller, separate and distinct from the migration domain controller and capable of administering source domain accounts, is maintained in the source domain. After a user's account is migrated, the migrated user will be encouraged to logon to the target domain and utilize the target domain controllers. However, in the event of a failure in the target domain with respect to a migrated source domain account, the migrated source domain account will continue to have access to the source domain, and its associated resources through the remaining source domain controller.

In accordance with a preferred embodiment of the invention, the process for gradually changing to the new network operating system progresses to an emulation stage wherein any remaining source domain controllers are disabled. As a result, the migrated source domain accounts are no longer administered by a source domain controller with respect to the source domain. However, in a preferred embodiment of the invention, a domain controller in the target domain assumes account administration responsibilities with respect to the migrated source domain accounts. Furthermore, migrated users and services will continue to have access to the resources of the source domain through at least the migration domain controller which includes account security context information for migrated accounts with respect to both the source and target domains.

The account information for the migrated domain is always preserved during migration within a data structure within the target domain databases. A further advantage of the present invention arising from the preservation of source domain account information is the ability to backtrack from any stage of migration to a previous stage. Therefore, if for any reason the migration process is abandoned, the source domain will be unaffected by the previous attempt to migrate to the target domain.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 2 is a schematic drawing illustratively depicting a migrated account object, including a list of account identifications with which a particular account is associated, the list including account identifications previously assigned to the account;

FIG. 3 is a schematic drawing of an illustrative group list for an account wherein the group list includes entries corresponding to previous account identifications assigned to the account as well as a previous group account identification for a group account with which the account is associated;

FIG. 4 is a schematic drawing depicting the information included within a data structure for a migrated domain stored upon a target domain directory service of objects database in accordance with a preferred embodiment of the invention;

DETAILED DESCRIPTION OF THE DRAWINGS

Figure 1:
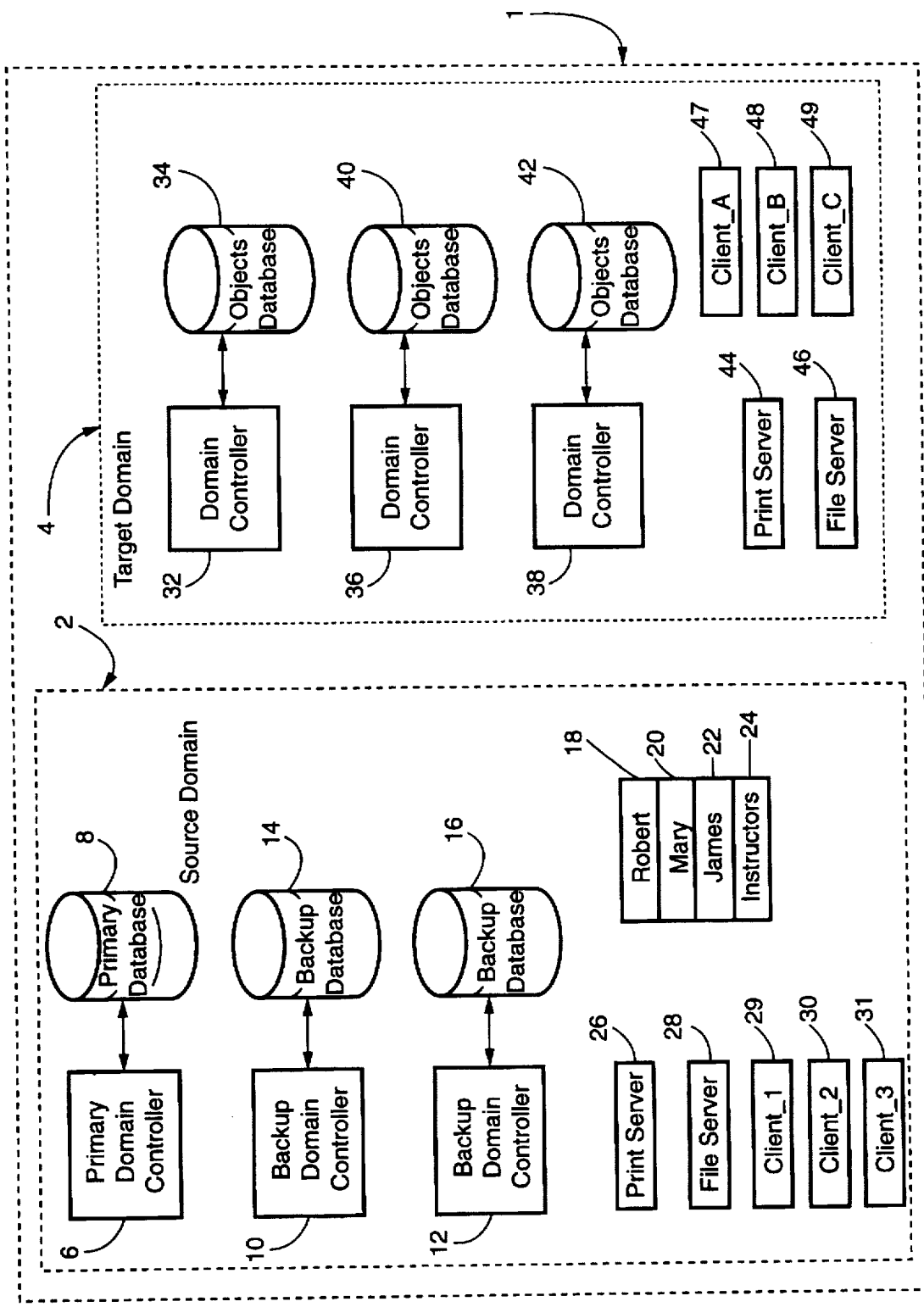
FIG. 1 is a schematic drawing of a network comprising multiple domains.

Turning now to FIG. 1, a schematic drawing is provided of a network 1 suitable for incorporating the present invention. The network 1 comprises a Source Domain 2 and a Target Domain 4. In the preferred embodiment of the present invention, the Source Domain 2 operates under the MICROSOFT® WINDOWS™ NT network operating system. In accordance with the well known WINDOWS NT network operating system, the Source Domain 2 includes a Primary Domain Controller 6 and Backup Domain Controllers 10 and 12. The domain controllers 6, 10, and 12 are network servers with additional installed facilities for administering accounts and network resources associated with the domain. One of the responsibilities of a domain controller is maintaining a directory service of objects for enforcing restricted access to resources by logged on users and services within a domain. The directory service of objects enables the domain controller to provide security contexts for logged on users and services.

The Primary Domain Controller 6 administers accounts associated with the Source Domain 2 (e.g., adding, deleting, modifying account security information) and protected network resources for which it is responsible for enforcing restricted access. Administering the Source Domain 2, including creating contexts for logged on users, is facilitated by a Primary Directory Service of Objects Database ("Primary Database") 8 associated with the Primary Domain Controller 6. The Source Domain 2 also includes Backup Domain Controllers 10 and 12. The Backup Domain Controllers 10 and 12 are associated with Backup Directory Service of Objects Databases ("Backup Databases") 14 and 16 respectively. The Backup Databases 14 and 16 are updated with changed information whenever the Primary Database 10 is modified by means of well known replication procedures. However, WINDOWS NT backup domain controllers cannot modify account security information. Since backup domain controllers in a WINDOWS NT network operating system do not modify account security information, it is unnecessary to inform the Backup Domain Controllers 10 and 12 about changes to the Source Domain 2 controller membership during the migration of the Source Domain 2 into the Target Domain 4.

However, in an alternative embodiment of the invention all controllers in the source domain are capable of modifying source domain account information (i.e., there is no primary domain controller). The target domain controller responsible for replicating the accounts from the source domain synchronizes source domain account information using the established account replication mechanism of the source domain in order to synchronize information with the source domain directory service of objects databases. Thus, it may be necessary to inform all of the source domain controllers of the replicating target domain controller's presence in the source domain so that the target domain controller may obtain all subsequent changes.

Continuing with the description of FIG. 1, the Source Domain 2 also includes a set of user accounts 18, 20, and 22, and a group account 24. It is noted that in a network embodying the present invention, the number of accounts may range from a dozen or more corresponding to associated users, services and/or groups, to hundreds or even thousands of such accounts. Each user or service account is associated with account specific information, including an above described security context, which is used by servers to determine whether to grant access by the user or service to a requested resource in accordance with known WINDOWS NT computer security procedures. Each user or service account in a domain is stored with a password and a corresponding unique account identification within the Source Domain 2 which is used by the domain controllers 6, 10 and 12 to access a security context corresponding to a user or service. It is noted that users logon to the Source Domain 2 via client computers (e.g., workstations and stand-alone PC's). The client computers 29, 30, and 31 are merely representative. Networks embodying the present invention will include tens, hundreds, thousands, and even tens of thousands of such clients.

The Source Domain 2 also includes servers 26, 28, and 30. The servers 26 and 28 provide access to network resources such as printers and files. It is noted that while only two servers are illustrated in FIG. 1 (in addition to the domain controllers that are servers as well), it is contemplated that a domain will include many servers. A protected network resource on a server, in accordance with a preferred embodiment of the invention, is associated with an access control list (ACL) containing a set of access control entries (ACEs) which define the access rights of accounts to the protected network resources. When migrating the Source Domain 2 into the Target Domain 4 the access rights for migrated users and services to the protected network resources (embodied within the ACLs) are maintained during and after the migration of the accounts from the Source Domain 2 to the Target Domain 4. The maintenance of access rights owned previously by migrated accounts is indeed one of the aims of the illustrated embodiment of the present invention.

Turning to the Target Domain 4, a Domain Controller 32 is schematically illustrated along with an associated Directory Service of Objects Database ("Database") 34. The Domain Controller 32 in conjunction with the Database 34 facilitate maintenance of account information for Target Domain 4 accounts. The account information includes account identifications (including group identifications and former account identifications) with which the accounts are currently associated or have previously been associated (in the case of a migrated account). In the preferred embodiment of the present invention, the Domain Controller 32 is not a dominant domain controller (such as a WINDOWS NT primary domain controller). Instead, with respect to the capability of administering accounts (i.e., modifying account information), the Domain Controller 32 shares equal status with other established Domain Controllers 36 and 38 in the Target Domain 4 which are associated with Directory Service of Objects Databases ("Databases") 40 and 42 respectively. When account information changes in any of the Databases 34, 40 and 42, the information is automatically synchronized across all the Databases for the Target Domain 4. Such an account database replication/synchronization scheme is described in Neeman et al. U.S. Patent Application Ser. No. 08/181,704, entitled "Replication Facility" and filed on Jan. 14, 1994, now issued U.S. Pat. No. 5,588,147, which is assigned to MICROSOFT Corporation, the teachings of which are incorporated in their entirety by reference.

In the preferred embodiment of the present invention, the Domain Controller 32 is assigned a special dual status among the target domain controllers 32, 36 and 38. The special dual status, as will be explained further below, enables the Domain Controller 32 to participate (as a backup domain controller) in well known account replication within the Source Domain 2. It is through this replication capability that accounts in the Source Domain 2 are migrated to the Target Domain 4. While more than one target domain controller could conceivably acquire the special dual status, such capabilities are unneeded in view of the account replication capabilities possessed by the target domain controllers 32, 36 and 38. In addition to the domain controllers 32, 36, and 38, the Target Domain 4 also includes a Print Server 44 and a File Server 46.

The Target Domain 4 also includes client machines 47, 48 and 49. It is noted again that this is merely a representative drawing for purposes of describing a preferred embodiment of the present invention, and indeed a typical network embodying the present invention includes a much larger set of client machines (e.g., networked personal computers and workstations). It is further noted that while not illustrated, the Target Domain will include a number of users having corresponding accounts within the Target Domain 4 maintained within the directory service of objects databases 34, 40 and 42.

Turning now to FIG. 2, a set of fields schematically depict the information associated with an account maintained by a directory service of objects associated with a domain controller. The information summarized in FIG. 2 is used to build a security context for an account. Such information, in the case of a user or service account is used to determine access to requested protected network resources. Much of the account information depicted in FIG. 2 is well known to those skilled in the art, and indeed, these same fields of information are present for an account in the Source Domain 2 (an NT Domain). However, a noteworthy exception to the known information, placed within the fields of an account, that accompanies user or service requests is the security identifiers (SIDs) with which an account has previously been associated in a migrated domain that are appended to a migrated account.

As will be known to those familiar with the MICROSOFT® WINDOWS™ NT operating system, an Account Name field 50 specifies a name corresponding to an account that uniquely identifies the account within a (target) domain to which an account has been migrated. In accordance with a preferred embodiment of the invention, a Migrated Account Name field 51 specifies a name uniquely identifying the migrated account within the source domain. Because the name stored within the name fields 50 and 51 must be unique within their respective domains, they may differ. Two accounts migrated to a target domain from different source domains may have identical names in the Migrated Account Name field 51.

The domain with which an account is associated is identified in a Current Domain ID 52. An account's Current Domain ID 52 distinguishes the account from other accounts associated with different domains within a same network having a same account name or relative identification (stored in field 54 described below). The domain identification stored in the Current Domain ID 52, in combination with a relative identification for a specific account, uniquely identifies the account within a network wherein other accounts contain a same relative account identification.

Continuing with the description of FIG. 2, the directory service of objects also includes, for an account, a Current Relative ID field 54. The value stored in the Current Relative ID field 54 is an internal representation of an account within a domain (identified by the current Domain ID 52). The Current Domain ID 52 and the Current Relative ID 54 together make a security identifier (or SID). A SID uniquely identifies an account within a network. The SID for the User 18 may be, for example "1:3" which indicates that the User 18 has been assigned the relative ID "3" within a domain having a domain ID "1."

An migrated account SID for an account is stored within a Migrated Domain ID 53 and a Migrated Relative ID 55. Saving the migrated account SID within the account information for a migrated account facilitates locating the migrated account by its old SID.

In the preferred embodiment of the present invention, an account can be associated with other accounts for purposes of accessing protected network resources. This associated set of accounts is referred to as a "group" account. A group account is a collection of individual and/or group accounts that are collectively granted (or denied) a defined set of access rights to protected network resources based upon ACEs stored on the network resources identifying the group account. Group accounts facilitate reducing the number of ACEs stored on protected network resources by grouping a number of user accounts, having the same access rights to protected resources in the network, under a single group account. The single group account identification and access rights are placed within an ACE for a network resource in order to define the access rights for all members of the group on the network resource. A group account itself may be a constituent of another group account. The network in FIG. 1 could include, for example a Group Account including the Users 18, 20 and 22. Group accounts, like user accounts, also have names.

Having described a group account, the directory service of objects includes, for an account, a Group List 56. The Group List 56 includes a list of group account SIDs corresponding to the groups with which the account is associated in its current domain. Therefore, when an account is migrated into a new domain, new group SIDs are added to the Group List 56 which correspond to the new SIDs for the migrated group accounts. The group SIDs that were present within the Group List 56 before the account was migrated into a new domain are retained in the Group List 56.

Furthermore, in accordance with the preferred embodiment of the present invention, when an account is transferred to a new domain during a domain migration operation, the former SID for the account is appended to the Group List 56. The transferred account is associated with a new Domain ID corresponding to the new domain and a new relative ID is inserted within the Current Relative ID field 54 for the transferred account. Each time the account is transferred to a new domain (necessitating assigning a new SID to the account), the former SID is added to the Group List 56. The former SIDs are present in security contexts associated with migrated accounts and therefore enable users and services to maintain access to protected network resources when the ACLs of the protected network resources have not been updated to include the new SIDs assigned to transferred accounts during a domain migration procedure.

The information maintained by the directory service of objects for a group account in a domain also includes an Accounts Within Group List 58. The Accounts Within Group List 58 includes the current SIDs of all constituents of the group account.

Turning briefly to FIG. 3 an illustrative example is provided of values included in a Group List 56 for an account. In the example, the account is a member of three groups associated with the current domain identified by SIDs in Group list entries 62, 64 and 66. In addition, the account has been associated with at least one previously migrated domain. This is evidenced by a Prior Account ID 68 containing a SID previously assigned the account prior to the transfer of the account to the current domain. Prior Group #1 Account ID 70 contains a SID assigned the Group #1 Account, of which the account is a constituent, prior to the transfer of the Group #1 Account to the current domain.

In the preferred embodiment of the present invention, an administrator has the capability to delete prior SIDs from a group list for an account. Such entries are preferably removed after the administrator has ensured that the protected network resources have updated ACLs and will therefore recognize requests from the transferred account via the new SID corresponding to the domain into which the account has been transferred.

Turning now to FIG. 4, a set of fields associated with a migrating domain are provided. Such fields are included in a downlevel domain object (DDO) maintained within the Databases 34, 40 and 42 in the Target Domain 4, and represent the migrating and migrated domain within the Target Domain 4 during a Domain Migration procedure summarized in FIG. 5 comprising a trust stage, a migration stage, an emulation stage, and a normal stage.

A Domain Name 72 is the Source Domain 2 name of a migrated domain. The Domain Name 72 is defined for all stages of the migration procedure. A Domain ID 74 is the domain security ID for the domain associated with the DDO. The Domain ID 74 is defined for all stages of the migration procedure. A Mode 76 identifies the current stage of the migrating domain. The four possible migration stages include: trust, migration, emulation and normal.

An Old Outbound Trust Password 78, during the trust stage, is the old value of the password for the trusting side of the trust relationship to the Source Domain 2. In the migration stage, the Old Outbound Trust Password 78 is the old value of the password for the BDC account in the Source Domain 2 corresponding to the (propagating) Domain Controller 32. The Old Outbound Trust Password 78 is not defined for the emulation or normal stages.

A New Outbound Trust Password 80, during the trust stage, is the new value of the password for the trusting side of the trust relationship to the Source Domain 2. During the migration stage, the New Outbound Trust Password 80 is the new value of the password for the BDC account in the Source Domain 2 corresponding to the (propagating) Domain Controller 32. The New Outbound Trust Password 80 is not defined for the emulation stage or the normal stage.

An Inbound Trust Password 82, during the trust stage, is the value of the password for the trusted (permit to trust) side of the trust relationship to the Source Domain 2.

An Outbound Trusted Domains field 84, during the migration and emulation stages, is a list of domains the Source Domain 2 trusts. Each trusted domain represented in the Outbound Trusted Domains field 84 is identified by the trusted domain name, trusted domain SID, and old and new passwords for the trust account. The Outbound Trusted Domains field 84 is not defined for the trust stage. During the normal stage, this field is left undisturbed in order to allow transition back to the emulation stage.

An Inbound Trusted Domains field 86, during migration and emulation stages, is a list of domains that trust the Source Domain 2. Each entry in the list, corresponding to a trusting domain of the migrating Source Domain 2, contains the trusting domain name and the password for the trust account. The Inbound Trusted Domains field 86 is not defined for the trust stage. During the normal stage, the Inbound Trusted Domains field 86 is left undisturbed allowing transition back to the emulation stage.

A MigrationBdcName 88 which corresponds to the name of the BDC account in the Source Domain 2 to which the Primary Domain Controller 6 will replicate during the migration stage. The MigrationBdcName 88 is registered by the domain controller 32 in order to facilitate replication of accounts from the Source Domain 2. The MigrationBdcName 88 is defined only during the migration stage.

A Migrated Accounts portion 90 of the migrated account DDO comprises the accounts migrated from the Source Domain 2 to the Target Domain 4 during a domain migration operation (described below).

A Synchronization State 92 stores the state of Source Domain 2 replication for the replicating Domain Controller 32 during a migration stage (described below). The Synchronization State 92 contains sufficient information to enable another Target Domain Controller 36 or 38 to resume replicating accounts from the Source Domain 2 to the Target Domain 4 in the event that the designated Domain Controller 32 ceases to perform that function.

The final illustrated field is a Policy Data field 94. The Policy Data field 94 includes information specific to the Source Domain 2 relating to its operation. For example, this field may include password length limits, maximum life for a password, etc. This information may be used by the Target Domain Controllers 32, 36 and 38 to implement source domain policy, or it can be ignored.

Figure 5:
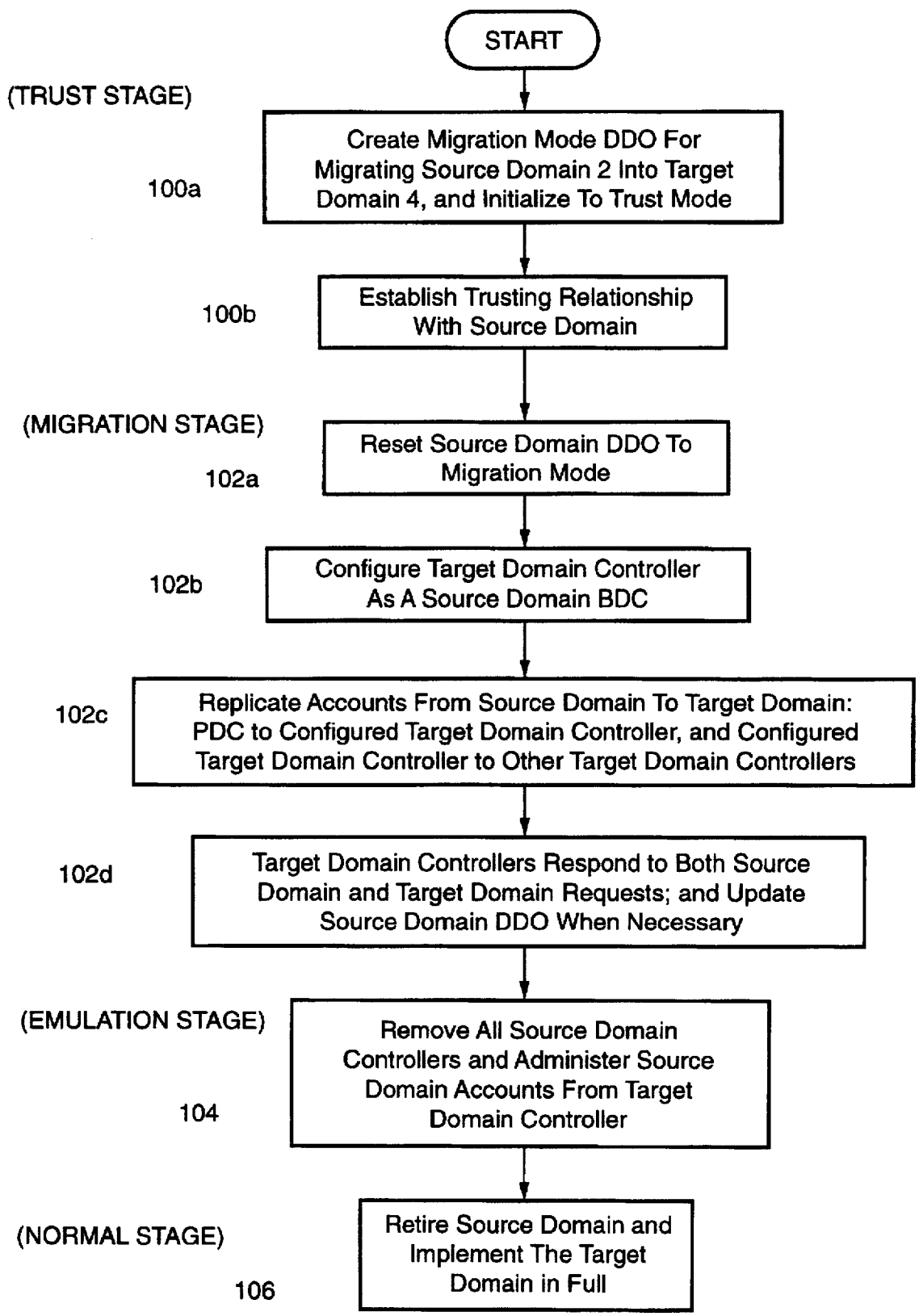
FIG. 5 is a flow chart illustrating the steps for gradually transferring control and utilization of domain accounts from a source domain to a target domain according to a preferred embodiment of the present invention.

Having described an illustrative network 1 including multiple domains and a preferred migrated account data structure, attention is now directed to FIG. 5 comprising a summary of the stages for migrating the Source Domain 2 into the Target Domain 4 in a preferred embodiment of the present invention. The stages summarized in FIG. 5 will be described with reference to the illustrative network depicted in FIG. 1. However, a network utilizing the present invention includes tens, hundreds, thousands, and even tens of thousands of accounts. It is further noted that the steps are generally followed in the order presented in FIG. 5. However, there is no time requirement with respect to progressing from one to another step. Furthermore, the migration process can be reversed or even stopped and the process abandoned without harm to the migrating domain until all domain controllers in the source domain have been turned off and their account databases invalidated by changes to the migrated accounts.

Furthermore, multiple domains may participate in domain migration into the Target Domain 4 and be at different stages in the domain migration procedure at a given time. In the case of multiple domains concurrently migrating to the Target Domain 4, each migrating domain is represented in the Target Domain 4 by a separate DDO. Each directory service of objects database 34, 40 and 42 stores a copy of the DDO for a migrating domain. A propagating domain controller in the Target Domain establishes a domain controller entity within each migrating domain in order to facilitate replication.

Stage 100 in the process for gradually transferring administrative control and utilization of migrated accounts from a Source Domain 2 to a Target Domain 4 is referred to as the "Trust" stage. During the Trust stage 100, at step 100a the Domain Controller 32 creates a DDO for the Source Domain 2 of a type schematically illustrated in FIG. 4. After creating the Source Domain 2 DDO, the Source Domain 2 name and Domain ID are inserted within the Domain Name 72 and the Domain ID 74 respectively. In addition, the Mode 76 is set to "Trust", and thus during the Trust stage 100, the Source Domain 2 is represented in the Target Domain 4 by a DDO marked as a "Trust Mode" DDO.

Importantly, during the Trust Mode of operation, the Source Domain 2 DDO includes information defining the trusting relationship between the Target Domain 4 and the Source Domain 2. This information includes a new password for the trusting side of the trust relationship to the Source Domain 2 stored in the New Outbound Trust Password 80. If the Source Domain 2 trusts the Target Domain 4, then an Inbound Trust Password 82 is also stored in the DDO.

During the Trust stage 100, all accounts in the Source Domain 2 reside solely on the Source Domain 2. However, during step 100b a trusting relationship is established between the Source Domain 2 and the Target Domain, by means of well known WINDOWS NT network operating system procedures, such that Target Domain 4 controllers 32, 36 and 38 trust the Source Domain 2 controllers 6, 10 and 12 to respond to pass through authentication requests from the Target Domain 4. Thus, during the Trust stage 100, administration of Source Domain 2 accounts is performed solely by the Source Domain 2, and in the particular example, where the Source Domain 2 is a WINDOWS NT domain, by the Primary Domain Controller 6. While in the Trust stage 100, users and services associated with the Source Domain 2 logon to the Source Domain 2 directly via one of the Source Domain controllers 6, 10 or 12; or alternatively, by means of one of the Target Domain 4 controllers 32, 36 or 38 and the established trusting relationship. In the latter instance, the Target Domain 4 controllers 32, 36 or 38 pass through the logon request to one of the Source Domain 2 controllers 6, 10 or 12.

Furthermore, after establishing the trusting relationship with the Source Domain 2 during step 100b, individual Source Domain 2 accounts are provided access to Target Domain 4 resources in accordance with contexts provided by one of the Source Domain 2 controllers 6, 10, or 12. Users associated with Source Domain 2 individual accounts access and sample network resources within the Target Domain 4 before their corresponding accounts are migrated to the Target Domain 4. The creation of the trusting relationship between the Target Domain 4 and the Source Domain 2, before commencing copying of accounts to the Target Domain 4, enhances user confidence in the Target Domain 4. The existence of the trusting relationship also lessens the degree of urgency in transferring the Source Domain 2 accounts to the Target Domain 4 in order to maintain access to network resources transferred to the Target Domain 4—even after a substantial portion of the resources have been transferred to the Target Domain 4.

It is noted that Source Domain 2 servers and their associated resources are manually transferred (if at all) to the Target Domain 4. A domain controller in the Source Domain 2 could be refitted with new network operating system software and added as a domain controller in the Target Domain 4. While the process of moving resources to the Target Domain 4 may commence during the Trusting stage 100, the moving process is not confined to any particular stage of the domain migration procedure.

Stage 102 in the process for gradually transferring administrative control and utilization of migrated accounts from a Source Domain 2 to a Target Domain 4 is referred to as the "Migration" stage. In general, during the Migration stage 102, accounts (including both user and group accounts) are copied and exist on both the Source Domain 2 and the Target Domain 4. The Source Domain 2 is represented within the Target Domain 4 by the same DDO representing the Source Domain 2 during the Trust stage 100. However, the Mode 76 of the DDO is marked as a "Migration Mode" DDO (during step 102a), and the DDO is transformed into a directory, thereby enabling accounts from the Source Domain 2 to be copied as files into the directory.

During the Migration stage 102, migrated accounts exist in both the Source Domain 2 and the Target Domain 4. However, in the preferred embodiment of the present invention, the migrated Source Domain 2 accounts are read-only within the Source Domain 2 DDO and can only be changed by the Source Domain 2, and in particular by the Primary Domain Controller 6. Thus, any modifications to the migrated accounts must be initially carried out by logging onto the Primary Domain Controller 6. The changes to the migrated accounts are replicated to all Source Domain Backup Domain Controllers, and in accordance with an illustrative embodiment of the present invention, to the Target Domain 4 controllers via additional replication steps.

Figure 6:
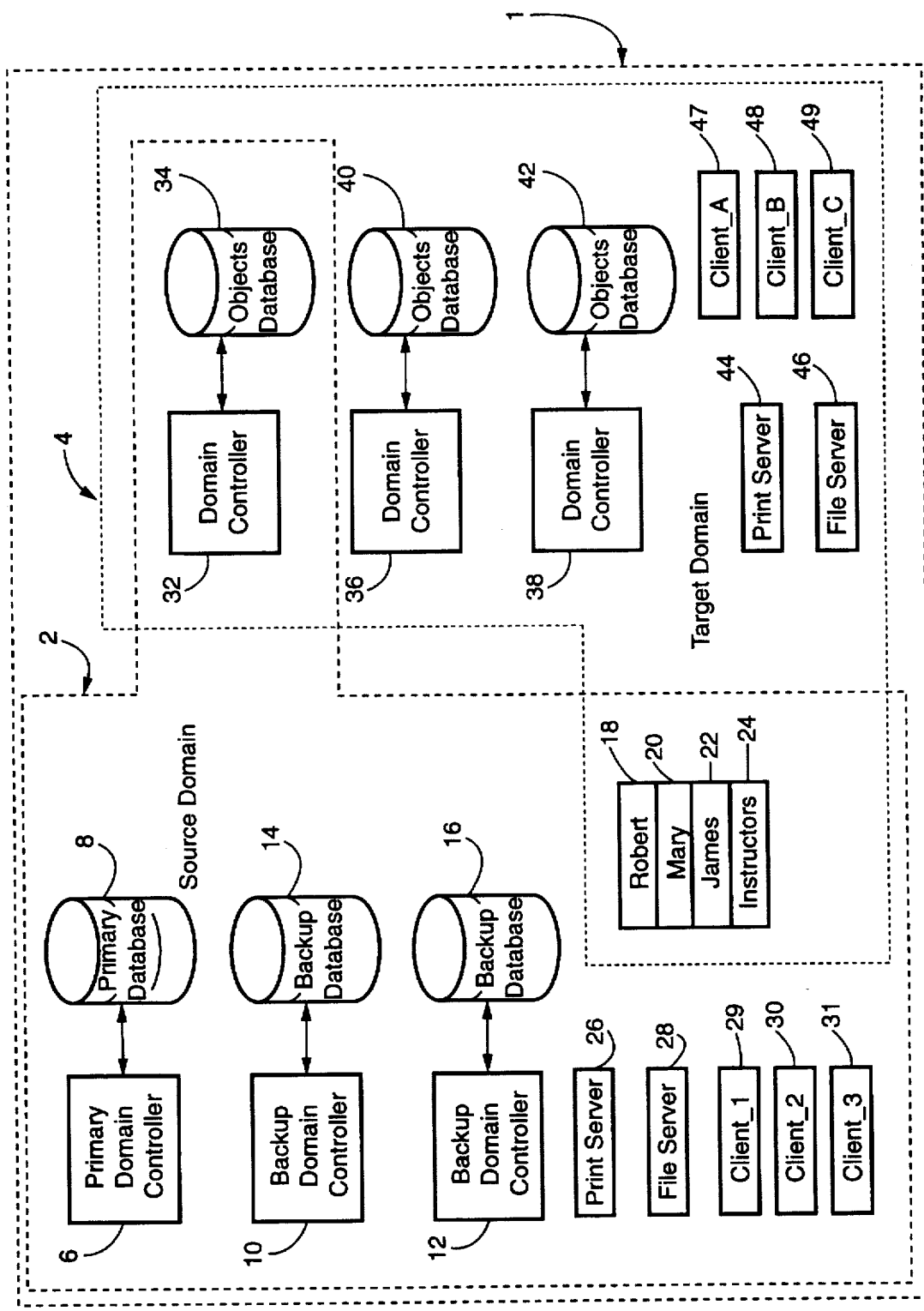
FIG. 6 illustratively depicts the network of FIG. 1 after a target domain and source domain have entered a migration mode according to a second stage of the procedure summarized in FIG. 5.

In general, during the Migration stage 102, the Domain Controller 32, in contrast to the other Target Domain Controllers 36 and 38, exhibits a special dual status enabling the Domain Controller 32 to participate in two separate and distinct account replication and synchronization procedures with respect to the Source Domain 2 and the Target Domain 4 in order to migrate accounts from the Source Domain 2 to the Target Domain 4. With respect to the Source Domain 2, the Domain Controller 32 participates in account replication and synchronization activities performed by WINDOWS NT backup domain controllers, such as Backup Domain Controllers 10 and 12, in order to obtain a copy of the account database from the Primary Domain Controller 6. In addition, the Domain Controller 32 participates in account replication and synchronization within the Target Domain 4, in order to propagate migrated accounts to the Domain Controllers 36 and 38. Such a replication scheme, used for all directory service objects replicated on the Target Domain 4, is described in Neeman et al. U.S. patent application Ser. No. 08/181,704, entitled "Replication Facility" and filed on Jan. 14, 1994, now issued U.S. Pat. No. 5,588,147, which is assigned to MICROSOFT Corporation, the teachings of which are incorporated in their entirety by reference. The simultaneous affiliation of the Domain Controller 32 with the Source Domain 2 and the Target Domain 4 for purposes of migrating and propagating Source Domain 2 accounts to the Target Domain 4 during the Migration stage 102 is illustratively depicted in FIG. 6.

Steps 102a, 102b, and 102c in FIG. 5 summarize the steps for migrating the Source Domain 2 accounts to the Target Domain 4 during the Migration stage 102. In particular, during step 102a of the Migration stage 102 the Domain Controller 32 modifies the Mode 76 of the DDO for the migrating Source Domain 2 to the migrating status.

Next, during step 102b, the Domain Controller 32 is configured as a backup domain controller (BDC) for the Source Domain 2. Configuring the Domain Controller 32 to be a Source Domain 2 BDC requires the creation of a BDC account for the Domain Controller 32 in the Source Domain 32 in a known manner. The name assigned to the BDC account is stored within the MigrationBdcName field 88 in the Source Domain 2 DDO in the database 34. For example the assigned name for the Domain Controller 32 will be SOURCE_0. The Domain Controller 32 thereafter receives replication and synchronization messages from the Primary Domain Controller 6 via network messages arriving under the name SOURCE_0 in accordance with known WINDOWS NT replication procedures.

After performing the above summarized set-up procedures, control passes to step 102b wherein account information is transferred to the Domain Controller 32. In the case of individual and group accounts, the information is modified according to further account migration procedures described below. After the accounts are replicated from the Primary Domain Controller 6 to the BDC configured Domain Controller 32, the Domain Controller 32 propagates the migrated account information from the database 34 to the databases 40 and 42 associated with the Domain Controllers 36 and 38 respectively via replication and synchronization procedures on the Target Domain 4. Such a replication scheme, used for all objects replicated on the Target Domain 4, is described in Neeman et al. U.S. patent application Ser. No. 08/181,704, entitled "Replication Facility" and filed on Jan. 14, 1994, which is assigned to MICROSOFT Corporation, the teachings of which are incorporated in their entirety by reference.

During step 102c, because replication of the entire set of Source Domain 2 accounts within the primary database 8 will probably not be completed all at once, and will in any event need to be updated in response to subsequent changes in the Primary Domain Controller's database 8 (announced to all of the Source Domain 2 BDCs), a Synchronization state 92 is maintained within the Source Domain DDO. The Synchronization state 92 is provided to the domain controllers 36 and 38 in the event that either takes over the replication and propagation role from the Domain Controller 32.

Migrating Individual and Group Accounts

During step 102c, after configuring the Domain Controller 32 as a backup domain controller in the Source Domain 2 (for purposes of replication), the Domain Controller 32, in cooperation with the Primary Domain Controller 6, obtains account information stored in the Primary Database 8 for individual and group accounts associated with the Source Domain 2 in accordance with known WINDOWS NT account synchronization and replication procedures. The Domain Controller 32 creates directory service account objects corresponding to the migrating Source Domain 2 objects (stored in the Migrated Accounts 90 in the Source Domain 2 DDO).

In contrast to ordinary Source Domain 2 (WINDOWS NT) account replication, the Domain Controller 32 assigns a Target Domain 4 account name to each migrated individual or group account object (stored in the Account Name 50 of the migrated account object). The Domain Controller 32 initially attempts to assign the Source Domain 2 account name of a migrated account to the migrated account's corresponding Target Domain 4 account. If a name conflict arises, a unique account name is identified for the migrated account in the Target Domain 4 and stored in the Account Name 50 in the directory service object corresponding to the migrated account. The Domain Controller 32 also stores the Source Domain 2 account name for the migrated account in the Migrated Account Name 51.

Furthermore, the Domain Controller 32 assigns a new SID to each migrated individual or group account. The new SID is stored as the Current Domain ID 52 and Current Relative ID 54 in the directory service object for the migrated account. Because migrated group accounts are also assigned new SIDs, the Domain Controller 32 updates the group SID entries within the Group list 56 of migrated individual and group accounts to correspond to Target Domain 4 SIDs assigned to the migrated groups.

In accordance with a preferred embodiment of the present invention, the former SIDs, with which a migrated individual or group account is associated, are maintained in the Target Domain 4 directory service object for the migrated account. The migrated account SID (corresponding to the Source Domain 2) is stored in the Migrated Domain ID 53 and the Migrated Relative ID 55. Furthermore, referring to FIG. 2, the remaining former SIDs are stored in the Group List 56. A method for storing former account SIDs is described in significant detail in Swift et al. U.S. patent application Ser. No. 08/587,275 filed on Jan. 18, 1996 and entitled "Method And Apparatus For Merging Domains" (Express Mail Serial No. TB07403065X US) the teachings of which are expressly incorporated herein by reference. As previously mentioned, the migrated account directory service object for the individual or group account is replicated to the databases 40 and 42 in accordance with Target Domain replication procedures.

Migrating "Trust" Relations

When the Source Domain 2 is migrated to the Target Domain 4, the capability of the Source Domain 2 to issue contexts to "trusting" domains is transferred to the Target Domain 4. The migrated trusting relationship is represented in the Inbound Trusted Domains field 86 of the Source Domain 2's DDO in the databases 34, 40 and 42. The Target Domain Controllers 32, 36 and 38 implement the trusting relationship as specific to the migrating Source Domain 2. In other words, the trusting relationship is confined to the Source Domain 2 and is not expanded to include requests from the Target Domain 4.

The capability of the Source Domain 2 to receive contexts from "trusted" domains is also transferred to the Target Domain 4. The migrated trusted relationship is represented in the Outbound Trusted Domains field 84 of the Source Domain 2's DDO in the databases 34, 40 and 42. The Target Domain Controllers 32, 36 and 38 implement the trusted relationship as specific to the migrating Source Domain 2. In other words, the trusted relationship is confined to the Source Domain 2 and is not expanded to include requests from the Source Domain 2's trusted domains to the Target Domain 4.

Migrating "Administrator" Group Accounts

Administrator Group accounts are replicated from the Source Domain 2 to the Target Domain 4 in a manner similar to other groups. However, in instances where an Administrator Group SID for the Source Domain 2 is indistinguishable from an Administrator Group SID in the Target Domain 4, the Source Domain 2 SID for the migrated Administrator Group account is discarded in order to prevent a member of the Source Domain 2 Administrator group from performing Target Domain 4 administrator functions. Therefore, contexts furnished by the Target Domain 4 controllers 32, 36 and 38 to users who are members of the Source Domain 2 administrators group do not include Source Domain 2 SIDs.

Migrating "Machine" Accounts

Machine accounts are also migrated from the Source Domain 2 to the Target Domain 4 during the Migration stage. The migrated machine accounts include a Target Domain SID, a Target Domain machine name, a Source Domain machine name, and a password for carrying out secure client/controller communications. As a result, Target Domain 4 controllers 32, 36 and 38 may logon a Source Domain 2 client and perform secure communications with the Source Domain 2 client. In addition, the workstation represented by the migrated machine account can join the Target domain 4 without further administrator intervention (i.e., manually adding the account to the Target domain 4).

In addition, the Domain Controller 32 receives other, Source Domain 2 specific information, during replication from the Primary Database 8, which is unnecessary to its role as a BDC in the Source Domain 2. This information, generally policy information about the Source Domain 2, is stored in the Policy Data 92 of the migrated Source Domain 2 DDO for purposes of back-tracking to the Source Domain in the event that a decision is made to halt and reverse the domain migration process.

Dual Domain Status of Target Domain Controllers

During migration, the Target Domain 4 Controllers 32, 36, and 38 appear in the list of controllers for both the Source Domain 2 and the Target Domain 4. Thus, Source Domain 2 client requests are handled by the Source Domain controllers 6, 10, and 12, and the Target Domain Controllers 32, 36 and 38. It is also noted that some requests may require domain-specific responses from the Target Domain 4 Controllers 32, 36 and 38. Target Domain 4 controllers are assigned a separate and distinct name when the accounts are migrated from the Source Domain 2 in order to eliminate any ambiguity with respect to which domain a Target Domain 4 controller is to direct its attention when responding to a particular request. System components which use the domain controller identifications are preferably capable of differentiating between the separate domain controller names assigned to a Target Domain controller during the Migration stage 102.

Operation of the Target Domain While In the Migration Stage

The general goal of the Migration stage 102 is to allow users with accounts in the Source Domain 2 to continue uninterrupted, unmodified access to the Source Domain 2 and its associated resources while providing the same users full access to the Target Domain 4 and its associated resources, from Target Domain 4 client machines. This goal is achieved through the above described account replication and propagation procedures and the resulting capability of the Target Domain controllers 32, 36 and 38 to respond to logon and requests for context information from users and services associated with the Source Domain 2. This ability of the migrated user and service accounts to exist and access resources in the Source Domain 2 and the Target Domain 4 is illustratively depicted in FIG. 6. The capabilities of the Target Domain Controllers 32, 36 and 38 to respond to Source Domain 2 requests from migrated users and services are described below.

Authenticating User Requests During The Migration Stage

After receiving a replicated, modified, set of accounts as described above, the Target Domain controllers 32, 36, and 38 respond to logon requests from migrated users (step 102d).

When a user or service specifies a Source Domain 2 account in order to logon to the Source Domain 2 via either a Source Domain or Target Domain client, the user is provided at least the Source Domain SIDs for the account. When a user or service logs onto the Source Domain 2 account via a Source Domain Client the user is only supplied the Source Domain 2-specific SIDs. If one of the Target Domain Controllers 32, 36 or 38 respond to logon requests for the Source Domain 2 from a Source Domain 2 client, only the source domain SIDs are provided in response to the request (i.e., the target domain SIDS are not provided).

A user or service having a migrated Source Domain account may log onto the Source Domain 2 through a Target Domain 4 client by specifying the Source Domain 2 and the user's Source Domain 2 account name. The Domain Controllers 32, 36 and 38 are all capable of recognizing the designated Source Domain 2 and consult their copies of the Migrating Mode DDO corresponding to the Source Domain 2 in order to respond to the request. In contrast to logging on via a Source Domain 2 client, one of the Target Domain Controllers 32, 36 or 38 returns a context containing both Source Domain 2 and Target Domain 4 SIDs.

Of course, the migrated user can also log onto the Target Domain 4 via a Target Domain 4 client (or a migrated Source Domain 2 client) by specifying the Target Domain 4 and the name of the migrated account in the Target Domain 4. In such an instance, the returned context includes both Source Domain 2 and Target Domain 4 SIDs.

Replicating Changes Made To The Primary Database 8

In its role as a backup domain controller in the Source Domain 2, during the Migration stage 102 the Domain Controller 32 participates in known accounts database replication activities associated with backup domain controllers in the WINDOWS NT operating system. In particular, while the Domain Controller 32 operates in the migration mode during stage 102, the Domain Controller 32 updates its database of transferred user accounts stored in the Database 34 in response to account database change "announcements" provided by the Primary Domain Controller 6 according to well known WINDOWS NT account database synchronization procedures. In accordance with its second role in the Target Domain 4, the Domain Controller 32 replicates the account changes to the Domain Controllers 36 and 38. Thus, any changes to Source Domain 2 account information stored in the Primary Database 8 are propagated to the Domain Controllers 32, 36 and 38 associated with the Target Domain 4. This role continues throughout the duration of step 102d after the Source Domain 2 accounts are initially replicated from the Primary Database 8.

Browsing

Each Target Domain Controller 32, 36 and 38 is each represented by two separate and distinct domain-specific machine names during migration of the Source Domain 2 into the Target Domain 4. Therefore, when a well known browser is applied to the network illustratively depicted in FIG. 6 (during the Migration stage 102), the Target Domain Controllers 32, 36 and 38 are separately and distinctly represented on the two distinct domains 2 and 4.

Trust Relations

As previously mentioned above, trust accounts, representing trust relationships established by the Source Domain 2, are maintained by the Domain Controllers 32, 36 and 38 for the migrated Source Domain 2. The Domain Controllers 32, 36, and 38, in their capacity as Source Domain 2 BDC's will respond to pass through authentication requests from domains and other network entities that trust the Source Domain 2. The Domain Controllers 32, 36 and 38 will also pass through authentication requests to other domains that the Source Domain trusts.

Having described the Migration Stage 102, a summary is provided below of the effect of the Migration stage 102 upon the network illustrated in FIG. 1. Applying the above described Migration stage 102 to the Source Domain 2 operating under the WINDOWS NT operating system, the accounts migrated from the Source Domain 2 to the Target Domain 4 are administered solely by the Primary Domain Controller 6 during the Migration stage 102. The Domain Controller 32, a BDC in the Source Domain 2, cannot modify the account information for Source Domain 2 accounts. The Primary Domain Controller 6 (a WINDOWS NT primary domain controller) maintains an updated and complete master copy of the account security information (stored in the Primary Database 8) for the Source Domain 2. The Domain Controller 32 (having WINDOWS NT backup domain controller capabilities) and the Domain Controllers 36 and 38 are provided account security information and possess capabilities needed to perform the above discussed functions of a backup domain controller in the Target Domain 4. Thus, the Primary Domain Controller 6 maintains control of the migrated Source Domain 2 accounts until the capabilities of the Domain Controllers 32, 36 and 38 have been tested under the load of the migrated user accounts and network resources. If the Domain Controllers 32, 36 and 38 fail or are deemed unacceptable during the Migration stage 102, then the Primary Domain Controller 6 will remain the dominant domain controller with respect to the Source Domain 2, the operation of the Domain controllers 32, 36 and 38 will be discontinued, and the Source Domain 2 and its associated accounts will revert back to a pre-migration state.

If, as expected, the Target Domain 4 performs well enough for the owner of the Source Domain 2 to place control over the migrated accounts in the hands of the Target Domain Controllers 32, 36 and 38, then the Source Domain Controllers 6, 10 and 12 are disabled. Thereafter, control passes to the Emulation stage 104 wherein the Source Domain 2 migrated accounts are administered by the Domain Controller 32.

Figure 7:
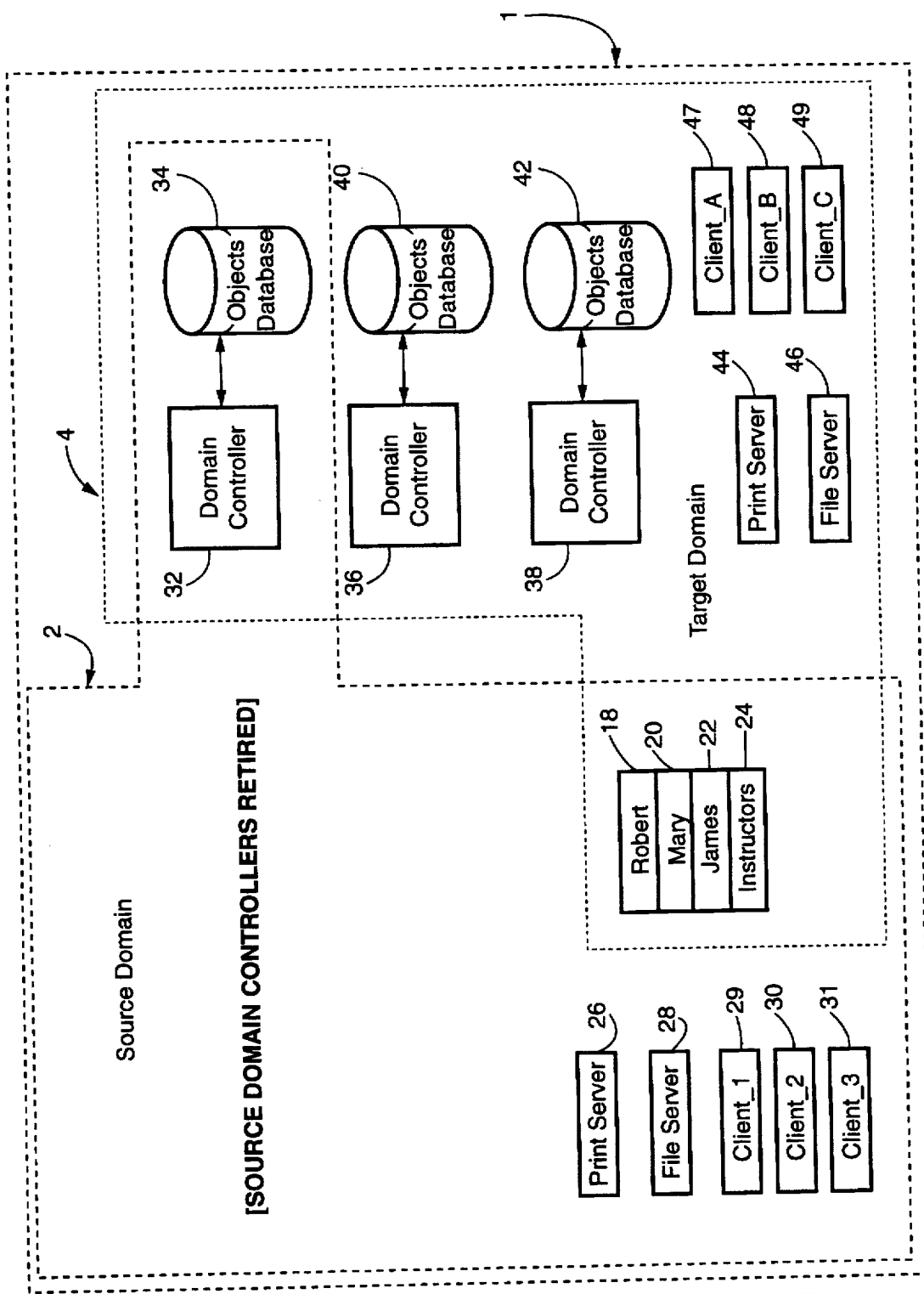
FIG. 7 illustratively depicts the network of FIG. 1 after a target domain and source domain have entered an emulation mode according to a third stage of the procedure summarized in FIG. 5 according to an embodiment of the present invention.

Stage 104 in the process for gradually transferring administrative control and utilization of migrated accounts from a Source Domain 2 to a Target Domain 4 (illustratively depicted in FIG. 7) is referred to as the "Emulation stage." The operation of the Target Domain 4 in the emulation stage 104 is nearly identical to the Migration stage 102. In particular, the following processes continue, unchanged, from the Migration stage 102: authenticating user and service requests via clients, browsing, implementing trust relations, and the dual domain status of the replicating Domain Controller 32. However, as mentioned above, the Source Domain Controllers 6, 10, and 12 are all disabled. Next, the Target Domain 4 is informed that it may now administer the migrated Source Domain 2 accounts. As such, the migrated Source Domain 2 account data is no longer "read only." However, while migrated accounts can be modified or deleted, new Source Domain 2 accounts cannot be created. The administrative role of the Primary Domain Controller 6 is assigned to the Domain Controller 32 which was previously a backup domain controller in the Source Domain.

In the event that the Domain Controller 32 relinquishes that role, it is dynamically allocated to one of the other Domain Controllers 36 and 38. Furthermore, in the preferred embodiment of the present invention, the propagating Domain Controller 32 was assigned the status of primary domain controller for the migrated Source Domain 2 when the Primary Domain Controller 6 was disabled. However, in alternative embodiments of the present invention, this role could be initially acquired by any of the Target Domain Controller 36 and 38.

Stage 106 in the process for gradually transferring administrative control and utilization of migrated accounts from a Source Domain 2 to a Target Domain 4 is the "normal" stage. During the normal stage 106, emulation of the Source Domain 2 is removed. While the migrated accounts continue to exist in both the Source Domain 2 and the Target Domain 4, users and services may no longer log onto the Source Domain 2 accounts. Clients that were members of the Source Domain 2 must join the Target Domain 4. However, some form of forewarning is provided to notify migrated users and migrated clients of the impending end to logging onto the Source Domain 2 and will therefore not be surprised by this change.

The Domain Controllers 32, 36 and 38 (that were previously emulating Source Domain 2 controllers) relinquish that status and cease to perform operations for the Source Domain 2. Browsing the Source Domain 2 is disabled. However, the Source Domain SIDs, that were previously saved in the Group List 56 for each migrated account, are maintained in the databases 34, 40 and 42 in order to ensure access by the migrated accounts to protected network resources that may not have updated ACLs reflecting the migration of accounts from the Source Domain 2 to the Target Domain 4.

Another aspect of domain migration, is the capability of Domain Controllers 32, 36 and 38, via SID-to-name and Name-to-SID translators, to map names to SIDs and map SIDs to names for either Source or Target Domain accounts. With respect to accounts migrated from a Source Domain to the Target Domain 4, during the Migration Stage 102 and the Emulation Stage 104, specification of a Target Domain 4 SID to the SID-to-name translator, renders a corresponding Target Domain 4 account name. Specification of a Source Domain 2 SID renders a Source Domain 2 account name.

The same pattern holds true for the name-to-SID translators during the Migration stage 102 and Emulation stage 104. In other words, specifying an account name and the name of the Source Domain 2, renders the SID of the account in the Source Domain 2. Specifying the Target Domain 4 name and an account name renders a Target Domain 4 SID for the account.

During the Normal stage 104, such translators only return Target Domain 4 names and SIDs. A SID-to-name translator maps a Source Domain 2 SID or Target Domain 4 SID to a currently assigned name of the corresponding account in the Target Domain 4. A Name-to-SID translator receives a Domain name (either a Source Domain or the Target Domain 4) and an account name, and returns a Target Domain 4 SID. The above searches, as will be appreciated by those skilled in the art, are facilitated by the current as well as migrated domain information stored in the Account Name 50, the Migrated Account name 51, the Current Domain ID 52, the Migrated Domain ID 53, the Current Relative ID 54 and the Migrated Relative ID 55 for a migrated account.

An illustrative example of the present invention has been described. However, as will be evident to those skilled in the art in view of the preferred embodiment described in the drawings and the foregoing written description, the scope of the present invention should not be restricted to the disclosed preferred embodiment. Examples of modifications include the form and content of the security account data structures, network topologies, network operating systems, and the specific details and order of execution of the described procedures for carrying out the transfer of control over a collection of network accounts from a first domain to a second domain. Furthermore, while the Source Domain and Target Domain operate under distinct sets of network operating system protocols, the above procedure is not limited to such an environment. Rather, the invention should be measured by the scope and spirit of the invention as defined by the claims appended below and include such modifications to the disclosed embodiments of the invention that would be known to those skilled in the art in view the disclosed embodiments.

What is claimed is:

1. A dual-member domain controller for a computer network having a network source domain mode, a separate and distinctly identified network target domain mode, and a set of source domain accounts associated with the network source domain mode, the dual-member domain controller comprising a request processor for receiving and processing network requests from users, and a target domain accounts database for storing account information associated with the network target domain mode; and operating simultaneously in two modes of operation: a source domain operating mode for facilitating transferring account information for the set of source domain accounts to the target domain accounts database, the transferred account information facilitating the creation by the dual-member domain controller of a set of migrated source domain accounts associated with the network target domain corresponding to the set of source domain accounts, and for responding to requests from users associated with the source domain accounts; and a target domain operating mode for responding to requests from users associated with target domain accounts.

2. The dual-member domain controller of claim 1, where, in the source domain operating mode, the dual-member domain controller assigns a target domain identification to each one of the set of migrated source domain accounts; and stores within the target domain database, for each one of the set of migrated source domain accounts, account identification information from the source domain with which the migrated source domain accounts are associated.

3. The dual-member domain controller of claim 1, wherein the dual-member domain controller is precluded from modifying source domain account security information relating to the set of source domain accounts while operating in the source domain operating mode.

4. The dual-member domain controller of claim 3, where, in the source domain operating mode, the dual-member domain controller facilitates administration of the source domain accounts.

5. The dual-member domain controller of claim 4, wherein the dual-member domain controller modifies source domain account security information relating to the set of source domain accounts.

6. In a computer network having a source domain and a target domain mode comprising a source domain computer generating source domain requests and a target domain computer generating target domain requests, a method for transferring source domain account information in a primary source domain controller to a primary target domain controller, the primary target domain controller operating in multiple simultaneous modes, the method comprising the steps of:

establishing the primary target domain controller as a backup source domain controller and as a target domain controller;

transferring source domain account information from the primary source domain controller to the primary target domain controller operating as the backup source domain controller;

replicating within the primary target domain controller the source domain account information, transforming and storing the replicated account information as target domain account information in the primary target domain controller; and responding, by the primary target domain controller, to source domain requests and target domain requests.

7. The method of claim 6, wherein the step of transforming and storing the replicated account information further comprises the steps of:

assigning a target domain identification to each migrated source domain account within the replicated account information; and storing within a target domain database, for each migrated source domain account, account identification information from the source domain mode with which the migrated source domain account is associated.

8. The method of claim 6, wherein the step of transforming and storing the replicated account information, the primary target domain controller is precluded from modifying source domain account security information while operating as the backup source domain controller.

9. The method of claim 8, further comprising the steps of:

changing the operating mode of the primary target domain controller to that of a source domain enhanced controller and of the target domain controller after the establishing step, thereby facilitating administration of the source domain account information by the primary target domain controller; and responding, by the primary target domain controller, to requests from users associated with target domain account information while operating as the source domain enhanced controller.

10. The method of claim 9, wherein the primary target domain controller modifies source domain account security information while operating as the source domain enhanced controller.

11. A dual-member domain controller for a computer network having a network source domain mode, a separate and distinctly identified network target domain mode, and a set of source domain accounts associated with the network source domain mode, the dual-member domain controller comprising a request processor for receiving and processing network requests from users, and a target domain accounts database for storing account information associated with the network target domain mode; and operating simultaneously in two modes of operation: a source domain operating mode for facilitating transferring account information for the set of source domain accounts to the target domain accounts database, the transferred account information facilitating the creation by the dual-member domain controller of a set of migrated source domain accounts associated with the network target domain corresponding to the set of source domain accounts, and for responding to requests from users associated with the source domain accounts; and a target domain operating mode for responding to requests from users associated with target domain accounts; wherein the dual-member domain controller is precluded from modifying source domain account security information relating to the set of source domain accounts while operating in the source domain operating mode.

12. The dual-member domain controller of claim 11, where, in the source domain operating mode, the dual-member domain controller facilitates administration of the source domain accounts.

13. The dual-member domain controller of claim 12, wherein the dual-member domain controller modifies source domain account security information relating to the set of source domain accounts.

* * * * *